United States Patent
Okuno et al.

(10) Patent No.: US 12,316,232 B2
(45) Date of Patent: May 27, 2025

(54) POWER SUPPLY DEVICE, ACF CONVERTER, AND AC ADAPTER

(71) Applicant: Panasonic Intellectual Property Management Co., Ltd., Osaka (JP)

(72) Inventors: Takeya Okuno, Nara (JP); Manabu Yanagihara, Osaka (JP); Hiroki Akashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 586 days.

(21) Appl. No.: 17/757,973

(22) PCT Filed: Dec. 17, 2020

(86) PCT No.: PCT/JP2020/047189
§ 371 (c)(1),
(2) Date: Jun. 24, 2022

(87) PCT Pub. No.: WO2021/145133
PCT Pub. Date: Jul. 22, 2021

(65) Prior Publication Data
US 2023/0022728 A1   Jan. 26, 2023

(30) Foreign Application Priority Data
Jan. 14, 2020   (JP) ................ 2020-003864

(51) Int. Cl.
*H02J 7/00* (2006.01)
*H02J 7/02* (2016.01)
(Continued)

(52) U.S. Cl.
CPC ....... *H02M 3/33571* (2021.05); *H02J 7/0042* (2013.01); *H02J 7/02* (2013.01);
(Continued)

(58) Field of Classification Search
USPC ................. 320/109, 110, 111, 112, 113, 114
See application file for complete search history.

(56) References Cited

U.S. PATENT DOCUMENTS

| | | | |
|---|---|---|---|
| 2013/0342184 A1* | 12/2013 | Briere | ................. H02M 3/1588 323/282 |
| 2016/0365801 A1 | 12/2016 | Phadke | |
| 2021/0126520 A1 | 4/2021 | Hayase | |

FOREIGN PATENT DOCUMENTS

| | | |
|---|---|---|
| JP | 2017-005988 | 1/2017 |
| JP | 6509414 B | 5/2019 |

OTHER PUBLICATIONS

International Search Report of PCT application No. PCT/JP2020/047189 dated Feb. 22, 2021.

* cited by examiner

*Primary Examiner* — Brian Ngo
(74) *Attorney, Agent, or Firm* — Rimon P.C.

(57) ABSTRACT

EMI noise is reduced and a component mounting area is suppressed, and downsizing of a power supply device is achieved. Power supply device includes transistor block, gate drive circuit block, and driver block. First gate terminal and second gate terminal are disposed on the same side as gate drive circuit block when viewed from a center of transistor block. Two output terminals are disposed on the same side as transistor block when viewed from a center of gate drive circuit block. At least a part of first drain terminal is included in a region sandwiched between first source terminal and second source terminal. Second drain terminal is disposed at a position deviating from an extension region that extends the region sandwiched between the first source terminal and the second source terminal beyond second source terminal as viewed from first drain terminal.

10 Claims, 11 Drawing Sheets

(51) Int. Cl.
 *H02M 1/08* (2006.01)
 *H02M 1/44* (2007.01)
 *H02M 3/335* (2006.01)
(52) U.S. Cl.
 CPC ............... *H02M 1/08* (2013.01); *H02M 1/44* (2013.01); *H02M 3/33576* (2013.01); *H02J 2207/20* (2020.01)

POWER SUPPLY DEVICE, ACF CONVERTER, AND AC ADAPTER

FIELD OF THE INVENTION

The present disclosure relates to a power supply device including two power transistors, an active clamp flyback converter (ACF converter), and an alternating current adapter (AC adapter).

DESCRIPTION OF THE RELATED ART

A power supply used as an AC adapter for charging a notebook computer, a mobile phone, or a smartphone is required to be downsized and have high output. To achieve such a power supply is to increase an energy density of the power supply. As one of the methods, there is a method of increasing a switching frequency using a power transistor having a small capacity to downsize peripheral components in a power supply device that performs power switching, which is a component constituting a power supply. On the other hand, gallium nitride (GaN) capable of forming various mixed crystals and easily forming a heterojunction interface is characterized in that a high-concentration two-dimensional electron gas layer (2DEG layer) is generated at the heterojunction interface by spontaneous polarization and piezoelectric polarization. A field effect transistor (FET) using the high-concentration 2DEG layer as a channel can be a low-on-resistance and low-capacitance transistor. Therefore, attention has been focused on a transistor capable of increasing the above-described switching frequency.

In the power supply device that uses one such GaN transistor or the like for each of a high side and a low side, when the switching frequency is increased, electromagnetic interference (EMI) noise radiated from the power supply device becomes significant. In order to reduce the EMI noise, it is generally effective to shorten a wiring length of a wiring line connecting a gate of a transistor and a gate drive circuit or a gate driver, and to shorten a wiring length of a wiring line connecting a drain terminal of a transistor on a low side and a source terminal of a transistor on a high side. A method of reducing this EMI noise by devising an arrangement of transistors when the transistors incorporated in a self-standing package are used as a power supply device is disclosed (PTL 1). In PTL 1, a measure is taken to shorten a wiring length of a wiring line connecting a gate of each of the transistors and a gate drive circuit.

Further, in order to increase the switching frequency, it is necessary to reduce a parasitic inductance. Therefore, it is effective to use transistors assembled in a surface mount package without lead terminals of the transistors.

CITATION LIST

Patent Literature

PTL 1: Japanese Patent No. 6509414

SUMMARY OF THE INVENTION

However, in PTL 1, a drain terminal of a low-side transistor (semiconductor switching element) and a source terminal of a high-side transistor (semiconductor switching element) are not close to each other, and it is not possible to sufficiently shorten a length of a board wiring line connecting the drain terminal of the low-side transistor and the source terminal of the high-side transistor. As a result, the EMI noise is not reduced, and it is difficult to achieve downsizing of the power supply device.

Therefore, an object of the present disclosure is to provide a power supply device capable of reducing EMI noise, suppressing a component mounting area, and achieving downsizing of the power supply device, an ACF converter including the power supply device, and an AC adapter using the ACF converter.

In order to solve the above problem, one aspect of a power supply device in the present disclosure includes a transistor block, a gate drive circuit block, and a driver block. The transistor block includes a first transistor and a second transistor. The first transistor includes a first drain terminal, a first source terminal, and a first gate terminal. The first source terminal is connected to a ground. The second transistor includes a second drain terminal, a second source terminal, and a second gate terminal. The second source terminal is connected to the first drain terminal. The gate drive circuit block includes a first gate drive circuit and a second gate drive circuit. The first gate drive circuit includes a passive element, and outputs a drive signal for driving the first transistor. The second gate drive circuit includes a passive element, and outputs a drive signal for driving the second transistor. The driver block outputs a pulse signal to the gate drive circuit block. The transistor block, the gate drive circuit block, and the driver block are arranged in this order in one direction. The first gate terminal and the second gate terminal are disposed on the same side as the gate drive circuit block when viewed from a center of the transistor block. An output terminal of the first gate drive circuit and an output terminal of the second gate drive circuit are disposed on a side of the transistor block when viewed from a center of the gate drive circuit block. At least a part of the first drain terminal is included in a region sandwiched between the first source terminal and the second source terminal. The second drain terminal is disposed at a position deviated from an extension region that extends the region sandwiched between the first source terminal and the second source terminal beyond the second source terminal when viewed from the first source terminal.

Further, one aspect of an ACF converter in the present disclosure includes a transformer having a primary side and a secondary side, a primary circuit connected to the primary side of the transformer and including an input, and a secondary circuit connected to the secondary side of the transformer. The primary circuit includes the power supply device described above. The secondary circuit includes a rectifier element and a capacitance connected to the rectifier element.

Further, one aspect of an AC adapter in the present disclosure uses the above-described power supply device or the above-described ACF converter.

According to the present disclosure, the EMI noise can be reduced, the component mounting area can be suppressed, and the downsizing of the power supply device can be achieved.

DETAILED DESCRIPTION OF THE PREFERRED EMBODIMENTS

Figure 9A:
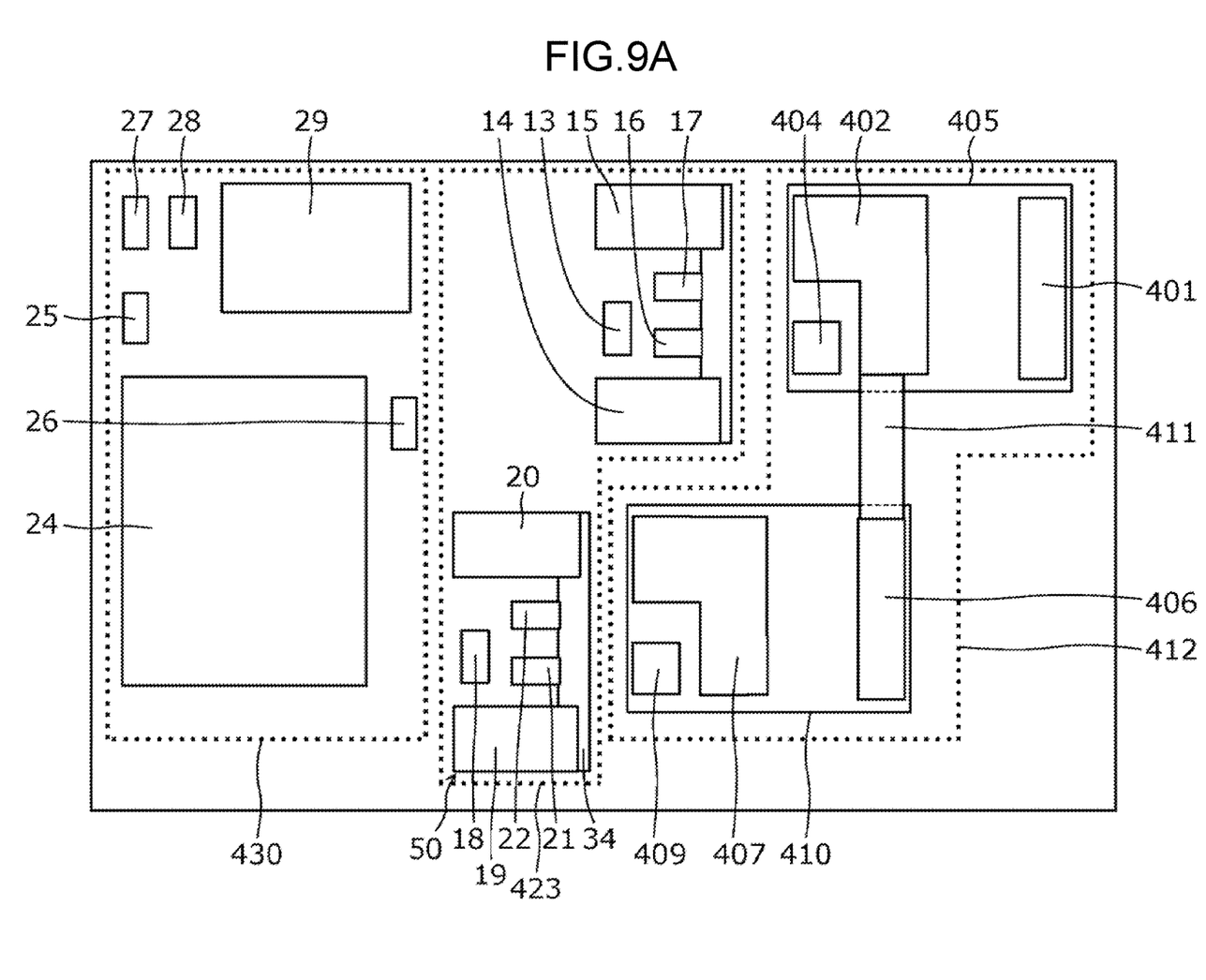
FIG. 9A is a diagram illustrating a first basic example of a diagram of a component arrangement around a transistor in a power supply device including a low-side transistor and a high-side transistor.
Figure 9B:
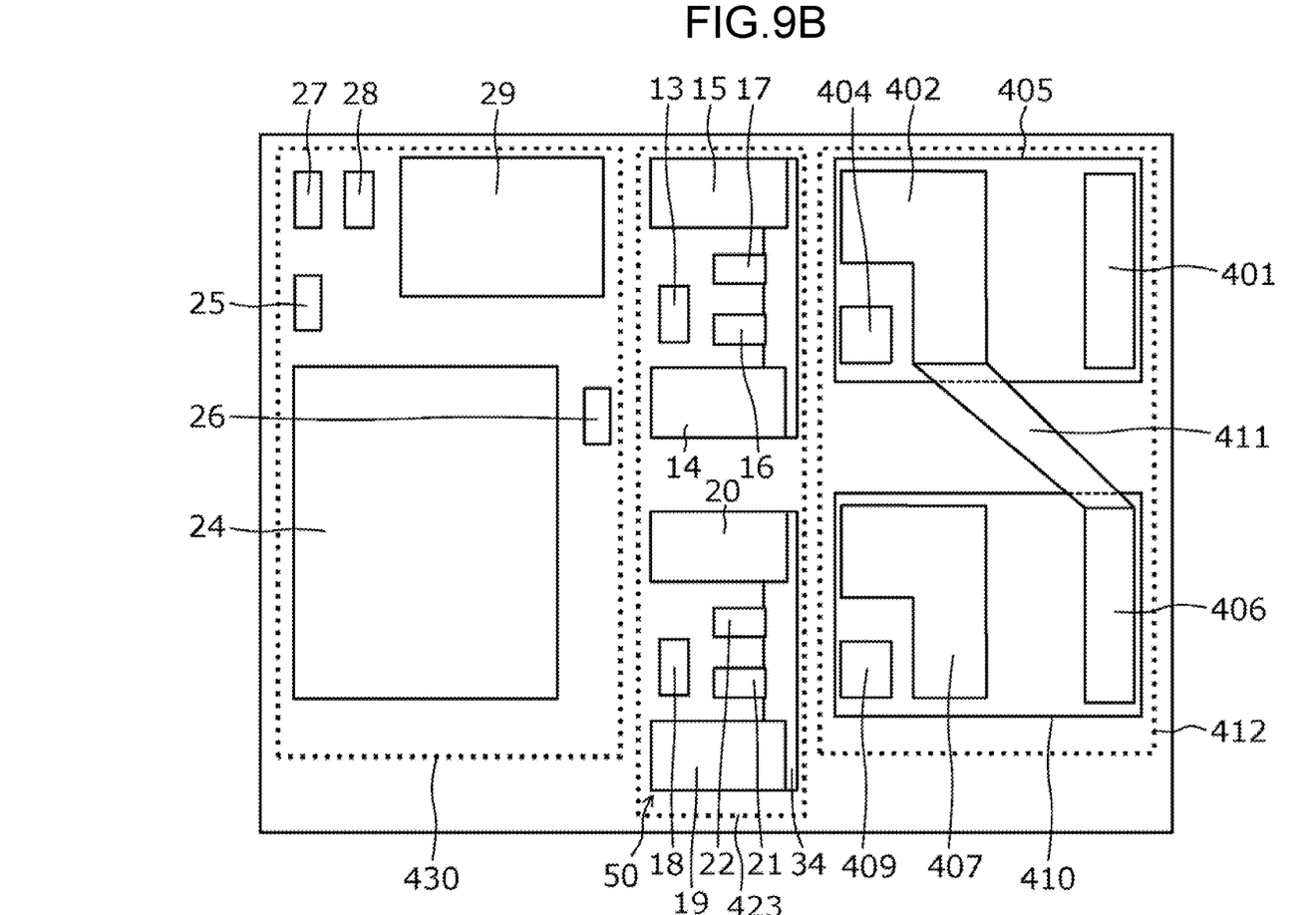
FIG. 9B is a diagram illustrating a second basic example of a diagram of a component arrangement around a transistor in a power supply device including a low-side transistor and a high-side transistor.

First, a power supply device on which the present invention is based will be described. FIG. 9A is a diagram illustrating a first basic example of a diagram of a component arrangement around a transistor in a power supply device including low-side transistor 410 and high-side transistor 405. FIG. 9B is a diagram illustrating a second basic example of a diagram of a component arrangement around a transistor in a power supply device including low-side transistor 410 and high-side transistor 405.

Both FIGS. 9A and 9B illustrate a basic component arrangement of the power supply device. These power supply devices include transistor block 412, gate drive circuit block 423, and driver block 430. Transistor block 412 is assembled into a leadless surface mount type package, and includes low-side transistor 410 and high-side transistor 405. Gate drive circuit block 423 includes a passive element, and drives transistors 410, 405. Driver block 430 outputs a pulse signal to gate drive circuit block 423. As illustrated in FIG. 9A, low-side transistor 410 includes first drain terminal 406, first source terminal 407, and first gate terminal 409. High-side transistor 405 includes second drain terminal 401, second source terminal 402, and second gate terminal 404. In FIGS. 9A and 9B, board wiring 411 connects first drain terminal 406 of low-side transistor 410 and second source terminal 402 of high-side transistor 405. In FIG. 9A, first drain terminal 406 of low-side transistor 410 is disposed immediately below second source terminal 402 of high-side transistor 405 in order to make a length of board wiring 411 as short as possible. In FIG. 9B, in order to reduce a board area, low-side transistor 410 and high-side transistor 405 are arranged side by side.

However, in the power supply device of FIG. 9B, first drain terminal 406 of low-side transistor 410 and second source terminal 402 of high-side transistor 405 are not close to each other, and the length of board wiring 411 cannot be sufficiently shortened.

Further, in the power supply device of FIG. 9A, it is necessary to secure a mounting space for diodes 14 and 15, resistors 16 and 17, and capacitance 13, which are peripheral components constituting a gate drive circuit for driving high-side transistor 405. Therefore, it is not possible to sufficiently shorten the length of board wiring 411 connecting first drain terminal 406 of low-side transistor 410 and second source terminal 402 of high-side transistor 405. Furthermore, since a space is formed between the peripheral components constituting the gate drive circuit for driving high-side transistor 405, and driver block 430, a wiring length of the wiring connecting the peripheral components and the driver block becomes long.

As a result, in both cases of FIGS. 9A and 9B, there is a problem that EMI noise is not reduced, and it is difficult to achieve downsizing of the power supply device.

An object of the invention according to the present disclosure is to solve the above problem.

Hereinafter, exemplary embodiments of the present disclosure will be described in detail with reference to the drawings. However, the same components are denoted by the same reference marks, and redundant description will be omitted.

First Exemplary Embodiment

Figure 1A:
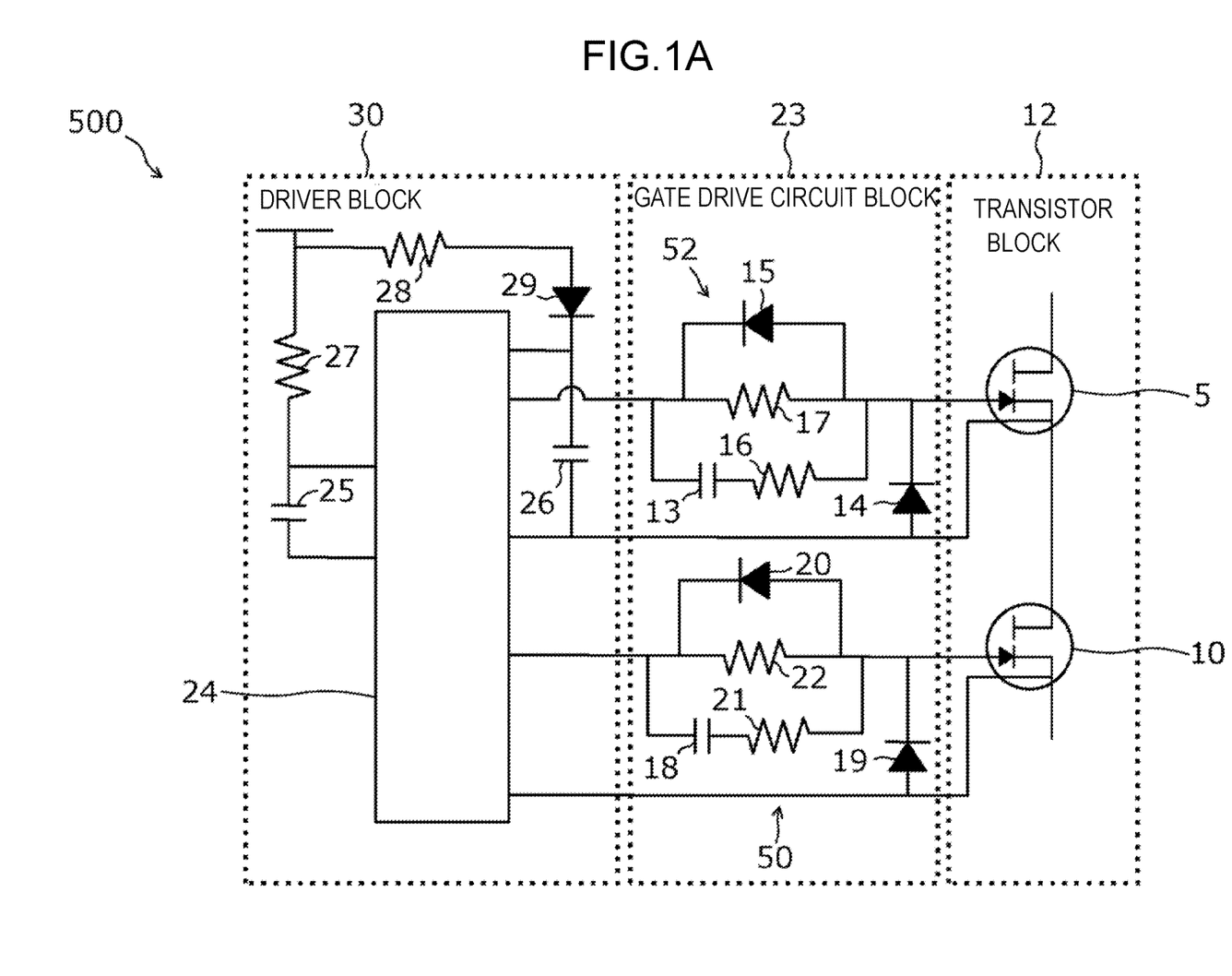
FIG. 1A is a circuit diagram around a transistor in a power supply device according to a first exemplary embodiment of the present disclosure.
Figure 1B:
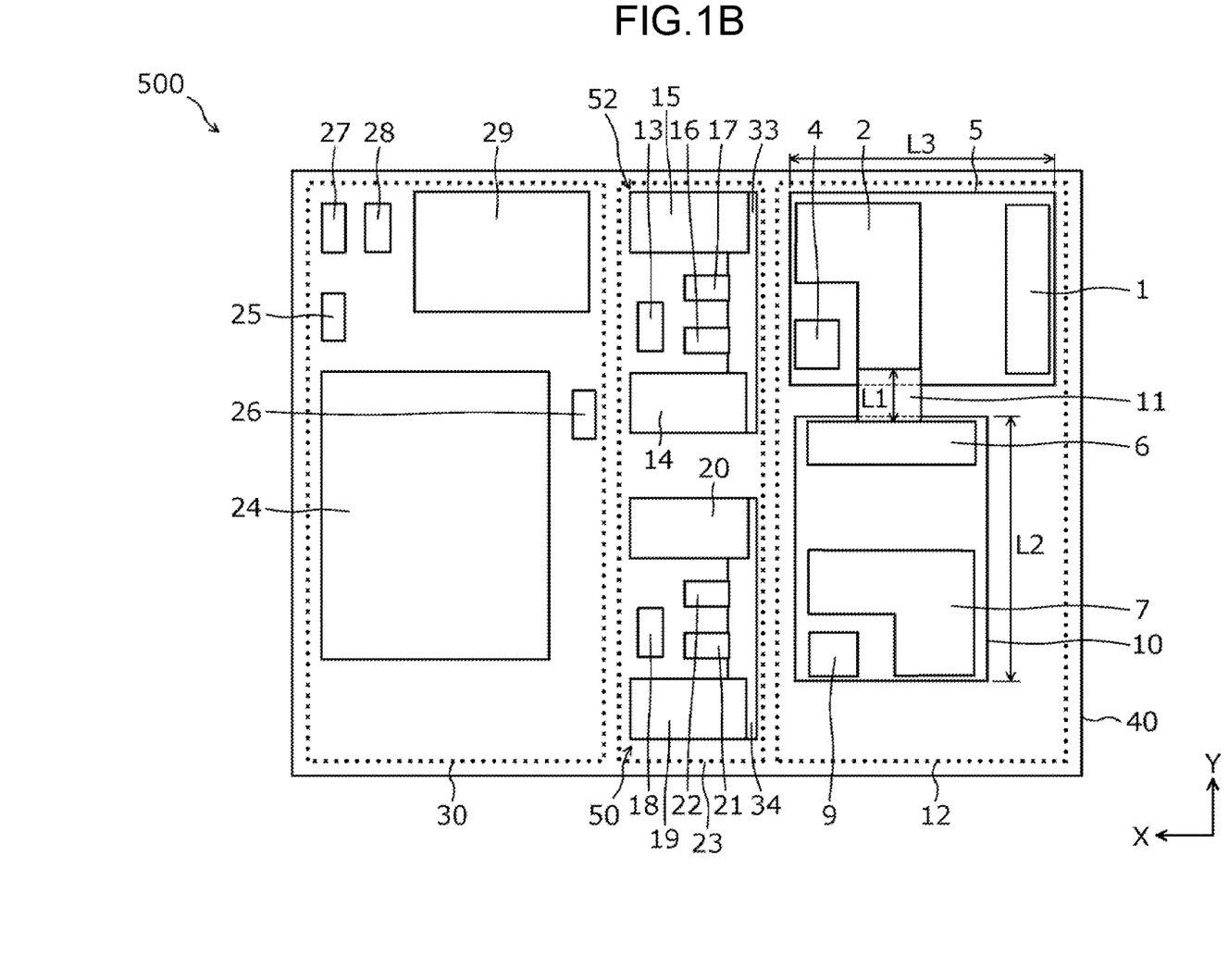
FIG. 1B is a diagram of a component arrangement around a transistor in the power supply device according to the first exemplary embodiment of the present disclosure.

FIG. 1A is a circuit diagram around a transistor in power supply device 500 according to a first exemplary embodiment of the present disclosure. FIG. 1B is a diagram of a component arrangement around a transistor in power supply device 500 according to the first exemplary embodiment of the present invention.

As illustrated in FIGS. 1A and 1B, power supply device 500 includes printed board 40 and components mounted on printed board 40. Power supply device 500 includes three blocks of transistor block 12, gate drive circuit block 23, and driver block 30. As described above, power supply device 500 can be divided into three blocks of transistor block 12, gate drive circuit block 23, and driver block 30. Transistor block 12, gate drive circuit block 23, and driver block 30 are arranged side by side in a first direction (X-axis direction), and are arranged in this order in one direction (X-axis plus direction). Further, each of transistor block 12, gate drive circuit block 23, and driver block 30 has a rectangular shape elongated in a second direction (Y-axis direction) perpendicular to the first direction.

As printed board 40, a resin board is generally used. By using a board having high heat dissipation such as an alumina board as printed board 40, thermal resistance of printed board 40 can be reduced. In a power supply having a high ratio of board cost to material cost like an AC adapter, a two-layer or four-layer resin board is generally used as printed board 40.

Transistor block 12 includes low-side transistor 10 and high-side transistor 5.

As illustrated in FIG. 1B, low-side transistor 10 includes first drain terminal 6, first source terminal 7, and first gate terminal 9. Low-side transistor 10 is mounted on printed board 40 using first drain terminal 6, first source terminal 7, and first gate terminal 9. At that time, low-side transistor 10 is disposed so as to be elongated in the second direction. First drain terminal 6, first source terminal 7, and first gate terminal 9 are arranged side by side in the second direction. First drain terminal 6 is disposed at a position closer to high-side transistor 5 than first source terminal 7 and first gate terminal 9 are. First gate terminal 9 is disposed on the same side as gate drive circuit block 23 as viewed from a straight line (not illustrated) passing through a center of low-side transistor 10 and parallel to the second direction. First source terminal 7 is disposed so as to be located on the same side as first drain terminal 6 when viewed from first gate terminal 9 and on an opposite side to gate drive circuit block 23 when viewed from first gate terminal 9. First source terminal 7 has an L shape. In the first exemplary embodiment, low-side transistor 10 corresponds to a first transistor including a first drain terminal, a first source terminal, and a first gate terminal, and having the first source terminal connected to a ground.

Similarly, high-side transistor 5 includes second drain terminal 1, second source terminal 2, and second gate terminal 4. High-side transistor 5 is mounted on printed board 40 using second drain terminal 1, second source terminal 2, and second gate terminal 4. High-side transistor 5 has a bilaterally symmetrical structure of a source terminal and a gate terminal with respect to low-side transistor 10. Here, the bilaterally symmetrical structure of the source terminal and the gate terminal refers to a structure described below. That is, it is considered that high-side transistor 5 is viewed in a direction from a surface of second drain terminal 1 toward a center of second source terminal 2 and from above a paper surface of FIG. 1B. At this time, second gate terminal 4 is disposed on a left side of a center of second source terminal 2, and second source terminal 2 is disposed on a right side of second gate terminal 4. On the other hand, it is considered that lower-side transistor 10 is viewed in a direction from a surface of first drain terminal 6 toward a center of first source terminal 7 and from above the paper surface of FIG. 1B. At this time, first gate terminal 9 is disposed on a right side of a center of first source terminal 7, and second source terminal 7 is disposed on a left side of first gate terminal 9. That is, the arrangement of the gate terminal and the source terminal when viewed in the direction from the surface of the drain terminal to the center of the source terminal and from above the paper surface of FIG. 1B has a left-right reverse relationship between high-side transistor 5 and low-side transistor 10. This is referred to as a bilaterally symmetrical structure of the source terminal and the gate terminal. High-side transistor 5 is disposed so as to be elongated in the first direction. Second drain terminal 1, second source terminal 2, and second gate terminal 4 are arranged side by side in the first direction. Second source terminal 2 and second gate terminal 4 are disposed at positions closer to gate drive circuit block 23 than second drain terminal 1 is. Second gate terminal 4 is disposed on a side toward low-side transistor 10 when viewed from a center of high-side transistor 5. Second source terminal 2 is disposed so as to be located on the same side as second drain terminal 1 when viewed from second gate terminal 4 and on an opposite side to low-side transistor 10 when viewed from second gate terminal 4. Second source terminal 2 has an L shape. Second source terminal 2 is disposed so as to be adjacent to first drain terminal 6 in the second direction. In the first exemplary embodiment, high-side transistor 5 corresponds to a second transistor including a second drain terminal, a second source terminal, and a second gate terminal, and having the second source terminal connected to the first drain terminal of low-side transistor 10.

First drain terminal 6 of low-side transistor 10 and second source terminal 2 of high-side transistor 5 are electrically connected by board wiring 11. As described above, high-side transistor 5 is connected to first drain terminal 6 via board wiring 11. A length of board wiring 11 in the second direction (see L1 in FIG. 1B) is shorter than a length of a long side of low-side transistor 10 (see L2 in FIG. 1B) and shorter than a length of a long side of high-side transistor 5 (see L3 in FIG. 1B). The length of the long side of low-side transistor 10 is a length of low-side transistor 10 in the second direction. The length of the long side of high-side transistor 5 is a length of high-side transistor 5 in the first direction.

As illustrated in FIGS. 1A and 1B, gate drive circuit block 23 includes first gate drive circuit 50 and second gate drive circuit 52.

Second gate drive circuit 52 is a drive circuit for outputting a drive signal for driving high-side transistor 5, and includes a passive element. Specifically, second gate drive circuit 52 includes any one or more of resistor 16, resistor 17, capacitance 13, diode 14, and diode 15, which are passive elements. Further, second gate drive circuit 52 includes output terminal 33. Output terminal 33 outputs a signal for driving high-side transistor 5. In the first exemplary embodiment, second gate drive circuit 52 includes resistor 16, resistor 17, capacitance 13, diode 14, and diode 15.

First gate drive circuit 50 is a drive circuit for outputting a drive signal for driving low-side transistor 10, and includes a passive element. Specifically, first gate drive circuit 50 includes any one or more of resistor 21, resistor 22, capacitance 18, diode 19, and diode 20, which are passive elements. First gate drive circuit 50 includes output terminal 34. Output terminal 34 outputs a signal for driving low-side transistor 10. In the first exemplary embodiment, first gate drive circuit 50 includes resistor 21, resistor 22, capacitance 18, diode 19, and diode 20.

Output terminal 33 for outputting a signal for driving high-side transistor 5 and output terminal 34 for outputting a signal for driving low-side transistor 10 are both disposed at positions close to transistor block 12 in gate drive circuit block 23. Specifically, output terminal 33 and output terminal 34 are on the same side as transistor block 12 as viewed from a straight line (not illustrated) passing through a center of gate drive circuit block 23 and parallel to the second direction. More specifically, output terminal 33 and output terminal 34 are arranged at an edge portion of gate drive circuit block 23 on a side of transistor block 12. Output terminal 33 is adjacent to second gate terminal 4 in the first direction. Output terminal 34 is adjacent to first gate terminal 9 in the first direction. Accordingly, in order to input a signal for driving high-side transistor 5 to high-side transistor 5, a wiring (not illustrated) connecting output terminal 33 and high-side transistor 5 can be shortened. Further, in order to input a signal for driving low-side transistor 10 to low-side transistor 10, a wiring (not illustrated) connecting output terminal 34 and low-side transistor 10 can be shortened. Therefore, there is an effect of reducing EMI noise.

As illustrated in FIGS. 1A and 1B, driver block 30 includes gate driver integrated circuit (IC) 24 that outputs a pulse signal to gate drive circuit block 23, and a passive element including resistor 27, resistor 28, capacitance 25, capacitance 26, and diode 29.

Low-side transistor 10 and high-side transistor 5 are made of, for example, GaN transistors, and are assembled into a surface mount package using the GaN transistors. By using the surface mount package, a parasitic inductor component can be reduced as compared with a self-standing package represented by TO220, and faster switching can be achieved.

In particular, the parasitic inductance can be greatly reduced by using a leadless surface mount type package. Note that the GaN transistors refer to transistors made of a group III nitride semiconductor represented by GaN.

Further, gate drive circuit block 23 may include only a resistor, but by combining a capacitance and a diode, faster switching and more stable driving can be achieved.

The passive element of driver block 30 is a component mainly for stabilizing a reference potential of the high-side signal. An element used for the passive element is determined by the specifications of gate driver IC 24.

As illustrated in FIG. 1B, low-side transistor 10 is disposed in a direction rotated by 90 degrees with respect to high-side transistor 5. Specifically, high-side transistor 5 is disposed such that second drain terminal 1, second source terminal 2, and second gate terminal 4 are arranged in the first direction. On the other hand, low-side transistor 10 is disposed such that first drain terminal 6, first source terminal 7, and first gate terminal 9 are arranged in the second direction. Further, the terminal arrangement is configured such that a positional relationship between first gate terminal 9 and first source terminal 7 in low-side transistor 10 and a positional relationship between second gate terminal 4 and second source terminal 2 in high-side transistor 5 are opposite to each other as viewed from the respective drain terminals. That is, the positional relationship between the gate terminal and the source terminal when viewed from the drain terminal in the low-side transistor and the positional relationship between the gate terminal and the source terminal when viewed from the drain terminal in the high-side transistor are opposite in the following sense. Specifically, the positional relationship between second gate terminal 4 and second source terminal 2 when viewed from second drain terminal 1 and the positional relationship between first gate terminal 9 and first source terminal 7 when viewed from first drain terminal 6 are opposite in the following sense. More specifically, when viewed from second drain terminal 1, second gate terminal 4 is disposed on a left side of the center of high-side transistor 5 in the left-right direction (second direction), and second source terminal 2 is disposed in an L shape so as to be located on a front side of second gate terminal 4 and on a right side of second gate terminal 4. On the other hand, when viewed from first drain terminal 6, first gate terminal 9 is disposed on a right side of the center of low-side transistor 10 in the left-right direction (first direction), and first source terminal 7 is disposed in an L shape so as to be located on a front side of first gate terminal 9 and on a left side of first gate terminal 9.

With this configuration, when low-side transistor 10 is disposed in the direction rotated by 90 degrees with respect to high-side transistor 5, first gate terminal 9 of low-side transistor 10 can be disposed on a side of transistor block 12 facing gate drive circuit block 23. Therefore, transistor block 12, gate drive circuit block 23, and driver block 30 can be arranged in this order in the first direction.

As long as high-side transistor 5 and low-side transistor 10 have the same electrode terminal configuration, the high-side transistor and the low-side transistor may be semiconductor chips not assembled in a package. In the case of mounting the semiconductor chip with a front surface side of the chip facing upward, a wire may be used instead of the wiring printed on printed board 40 to connect a drain pad of the low-side transistor and a source pad of the high-side transistor.

Figure 2A:
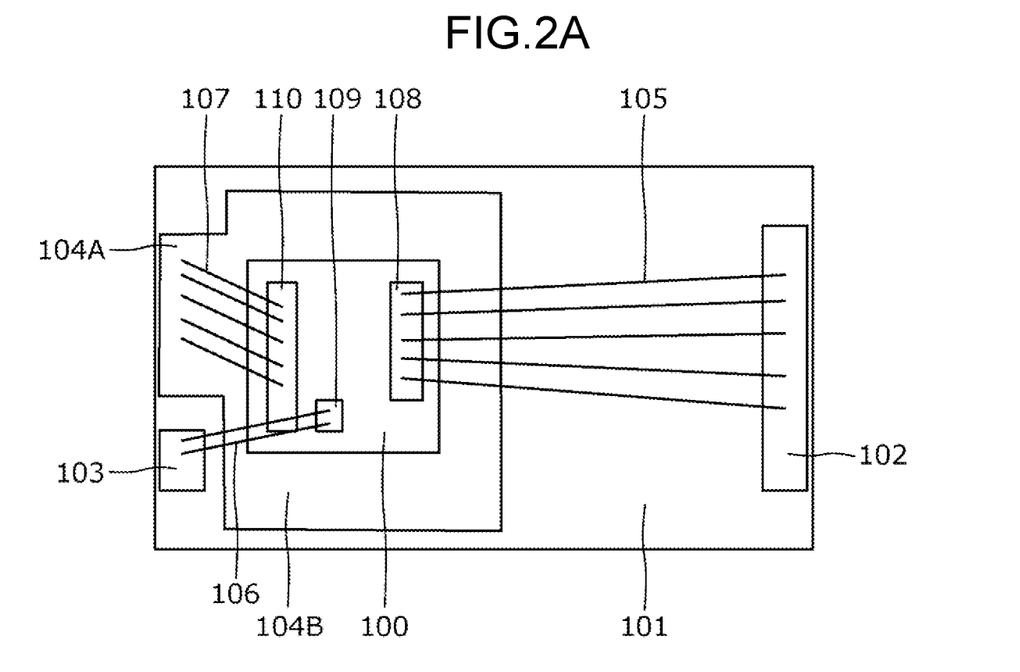
FIG. 2A is a diagram illustrating a pad structure of a semiconductor chip that achieves a terminal arrangement of a high-side transistor, and a wiring of a lead frame on which the semiconductor chip is mounted.
Figure 2B:
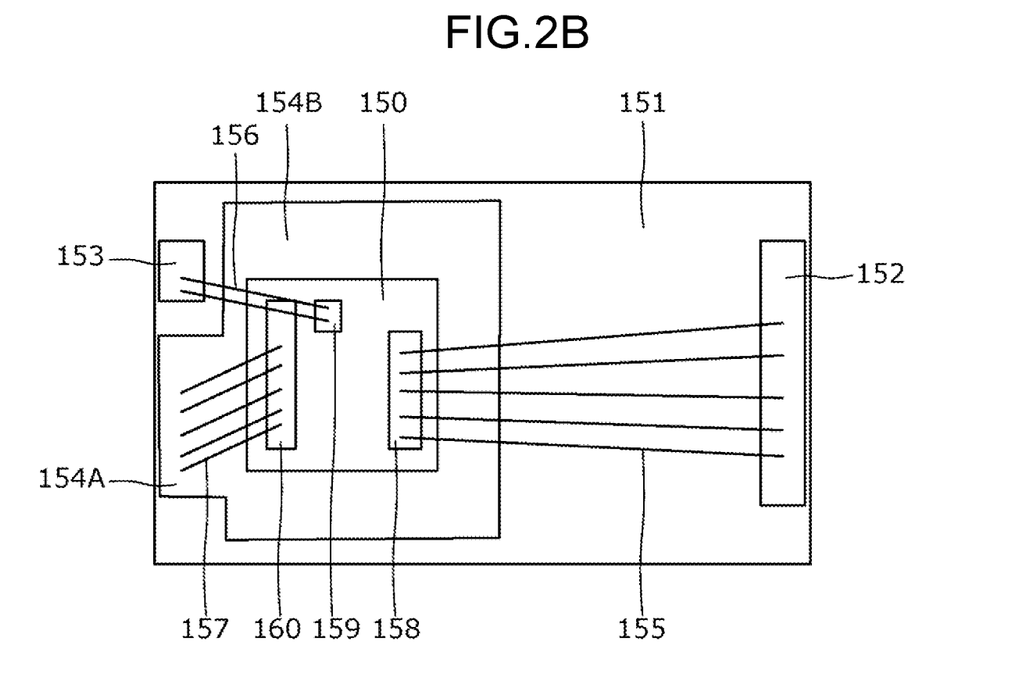
FIG. 2B is a diagram illustrating a pad structure of a semiconductor chip that achieves a terminal arrangement of a low-side transistor, and a wiring of a lead frame on which the semiconductor chip is mounted.

FIG. 2A is a diagram illustrating a pad structure of semiconductor chip 100 that achieves a terminal arrangement of high-side transistor 5, and a wiring of a lead frame on which semiconductor chip 100 is mounted. Similarly, FIG. 2B is a diagram illustrating a pad structure of semiconductor chip 150 that achieves a terminal arrangement of low-side transistor 10, and a wiring of a lead frame on which semiconductor chip 150 is mounted. Since actual high-side transistor 5 and actual low-side transistor 10 are sealed by resins 101, 151, respectively, FIGS. 2A and 2B are diagrams when the lead frame and the wire are seen through the resins.

As illustrated in FIGS. 2A and 2B, semiconductor chips 100 and 150 are, for example, GaN transistors. Semiconductor chip 100 includes drain pad 108, gate pad 109, and source pad 110 made of, for example, gold (Au) on a surface of semiconductor chip 100. Semiconductor chip 150 includes drain pad 158, gate pad 159, and source pad 160 made of, for example, gold (Au) on a surface of semiconductor chip 150.

Drain terminal 102, gate terminal 103, source terminal 104A, and die pad 104B are formed by cutting the lead frame after being sealed with resin 101. Drain terminal 152, gate terminal 153, source terminal 154A, and die pad 154B are formed by cutting the lead frame after being sealed with resin 151.

Source terminal 104A is electrically connected to die pad 104B on which semiconductor chip 100 is mounted. Source terminal 154A is electrically connected to die pad 154B on which semiconductor chip 150 is mounted.

Drain wire 105 electrically connects drain pad 108 of semiconductor chip 100 and drain terminal 102. Gate wire 106 electrically connects gate pad 109 of semiconductor chip 100 and gate terminal 103. Source wire 107 electrically connects source pad 110 of semiconductor chip 100 and source terminal 104A.

Similarly, drain wire 155 electrically connects drain pad 158 of semiconductor chip 150 and drain terminal 152. Gate wire 156 electrically connects gate pad 159 of semiconductor chip 150 and gate terminal 153. Source wire 157 electrically connects source pad 160 of semiconductor chip 150 and source terminal 154A.

Drain wires 105 and 155, gate wires 106 and 156, and source wires 107 and 157 are made of, for example, gold (Au) or copper (Cu), so that wire resistance can be reduced. Further, for example, by using copper (Cu) having a high coefficient of thermal conductivity for the lead frame forming die pad 104B and die pad 154B, heat generated from semiconductor chips 100 and 150 can be effectively dissipated.

Figure 3:
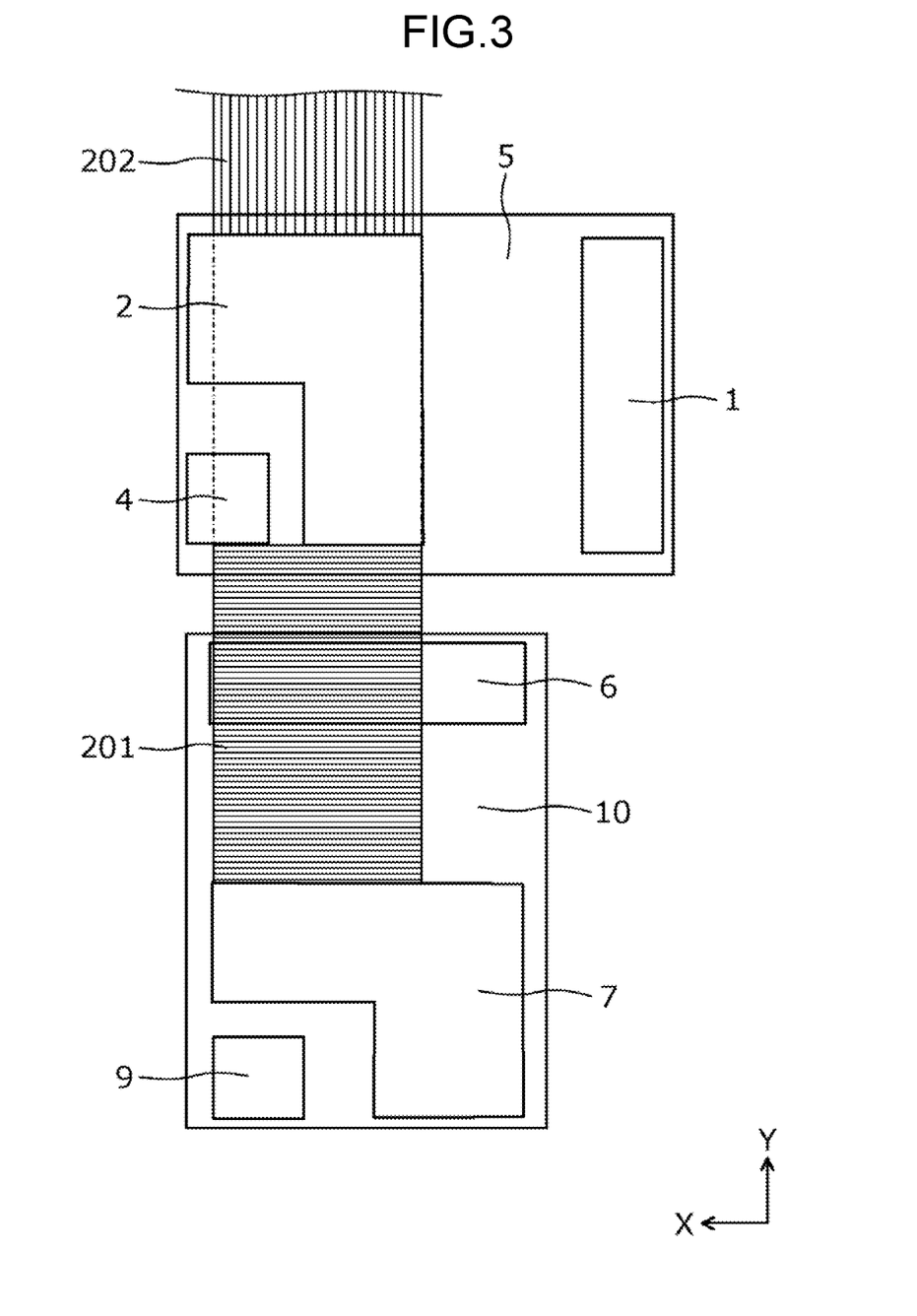
FIG. 3 is a diagram illustrating a region and an extension region.

FIG. 3 is a diagram illustrating region 201 and extension region 202. Note that, in order to avoid complication of the drawing, in FIG. 3, illustration of components other than low-side transistor 10 and high-side transistor 5 is omitted in the configuration of the first exemplary embodiment.

As illustrated in FIG. 3, at least a part of first drain terminal 6 of low-side transistor 10 is included in region 201 (see a border part in FIG. 3) sandwiched between second source terminal 2 of high-side transistor 5 and first source terminal 7 of low-side transistor 10. In other words, at least a part of first drain terminal 6 of low-side transistor 10 is located in region 201 sandwiched between second source terminal 2 of high-side transistor 5 and first source terminal 7 of low-side transistor 10.

Further, second drain terminal 1 of high-side transistor 5 is provided at a position deviated from extension region 202 (see a stripe part in FIG. 3) that extends region 201 between second source terminal 2 of high-side transistor 5 and first source terminal 7 of low-side transistor 10 to the other side (a plus side in the Y axis direction) of second source terminal 2 when viewed from first source terminal 7. In other words, second drain terminal 1 of high-side transistor 5 is disposed so as not to be located in extension region 202. Extension region 202 is located on a side opposite to low-side transistor 10 (a plus side in the Y-axis direction) as viewed from second source terminal 2 in the second direction.

According to the first exemplary embodiment, the length of board wiring 11 connecting first drain terminal 6 of low-side transistor 10 and second source terminal 2 of high-side transistor 5 can be shortened, and EMI noise and a component mounting area can be suppressed. By making the length of board wiring 11 shorter than the long side of low-side transistor 10 and the long side of high-side transistor 5, it is particularly effective in reducing EMI noise.

As described above, power supply device 500 according to the first exemplary embodiment includes transistor block 12, gate drive circuit block 23, and driver block 30. Transistor block 12 includes low-side transistor 10 and high-side transistor 5. Low-side transistor 10 includes first drain terminal 6, first source terminal 7, and first gate terminal 9. First source terminal 7 is connected to the ground. High-side transistor 5 includes second drain terminal 1, second source terminal 2, and second gate terminal 4. Second source terminal 2 is connected to first drain terminal 6. Gate drive circuit block 23 includes first gate drive circuit 50 and second gate drive circuit 52. First gate drive circuit 50 includes the passive element. First gate drive circuit 50 outputs a drive signal for driving low-side transistor 10. Second gate drive circuit 52 includes the passive element. Second gate drive circuit 52 outputs a drive signal for driving high-side transistor 5. Driver block 30 outputs a pulse signal to gate drive circuit block 23. Transistor block 12, gate drive circuit block 23, and driver block 30 are arranged in this order in one direction. First gate terminal 9 and second gate terminal 4 are on the same side as gate drive circuit block 23 as viewed from a straight line (not illustrated) passing through the center of transistor block 12 and parallel to the second direction. Output terminal 34 of first gate drive circuit 50 and output terminal 33 of second gate drive circuit 52 are on the same side as transistor block 12 as viewed from a straight line (not illustrated) that passes through the center of gate drive circuit block 23 and is parallel to the second direction. At least a part of first drain terminal 6 is included in region 201 sandwiched between first source terminal 7 and second source terminal 2. Second drain terminal 1 is at a position deviated from extension region 202 that extends region 201 sandwiched between first source terminal 7 and second source terminal 2 beyond second source terminal 2 as viewed from first source terminal 7.

According to this, first gate terminal 9 and second gate terminal 4 are on the same side as gate drive circuit block 23 as viewed from a straight line (not illustrated) passing through the center of transistor block 12 and parallel to the second direction. Further, output terminal 34 of first gate drive circuit 50 and output terminal 33 of second gate drive circuit 52 are on the same side as transistor block 12 as viewed from a straight line (not illustrated) that passes through the center of gate drive circuit block 23 and is parallel to the second direction. Therefore, the length of the wiring connecting first gate terminal 9 and output terminal 34 of first gate drive circuit 50 and the length of the wiring connecting second gate terminal 4 and output terminal 33 of second gate drive circuit 52 can be shortened. Furthermore, at least a part of first drain terminal 6 is included in region 201 sandwiched between first source terminal 7 and second source terminal 2. Therefore, the wiring length of the wiring connecting first drain terminal 6 and second source terminal 2 can be shortened. As a result, EMI noise can be reduced, a component mounting area can be suppressed, and downsizing of the power supply device can be achieved.

Further, low-side transistor 10 and high-side transistor 5 are assembled in the surface mount package.

According to this, a parasitic inductor component can be reduced and faster switching can be achieved as compared with the self-standing package.

Furthermore, low-side transistor 10 and high-side transistor 5 are made of GaN transistors.

According to this, the volume of power supply device 500 can be reduced by high-speed switching. Further, the efficiency can be improved by reducing area resistivity (Ron×A, Ron is on-resistance of the transistor, and A is an area of the transistor.).

Furthermore, the positional relationship between second gate terminal 4 and second source terminal 2 when viewed from second drain terminal 1 is opposite to the positional relationship between first gate terminal 9 and first source terminal 7 when viewed from first drain terminal 6.

According to this, in a case where low-side transistor 10 is disposed to be rotated with respect to high-side transistor 5, first gate terminal 9 of low-side transistor 10 can be easily disposed on the side of transistor block 12 facing gate drive circuit block 23. Consequently, the wiring connecting first gate terminal 9 and gate drive circuit block 23 can be further shortened. Therefore, EMI noise can be further reduced, and a component mounting area can be suppressed.

Further, the length of board wiring 11 electrically connecting second source terminal 2 and first drain terminal 6 is shorter than the length of the long side of low-side transistor 10 and shorter than the length of the long side of high-side transistor 5.

According to this, EMI noise can be further reduced, and a component mounting area can be suppressed.

Furthermore, first gate drive circuit 50 includes resistors 21, 22, capacitance 18, and diodes 19, 20. Second gate drive circuit 52 includes resistors 16, 17, capacitance 13, and diodes 14, 15.

According to this, faster switching and more stable driving can be realized.

First Modification Example of First Exemplary Embodiment

Figure 4:
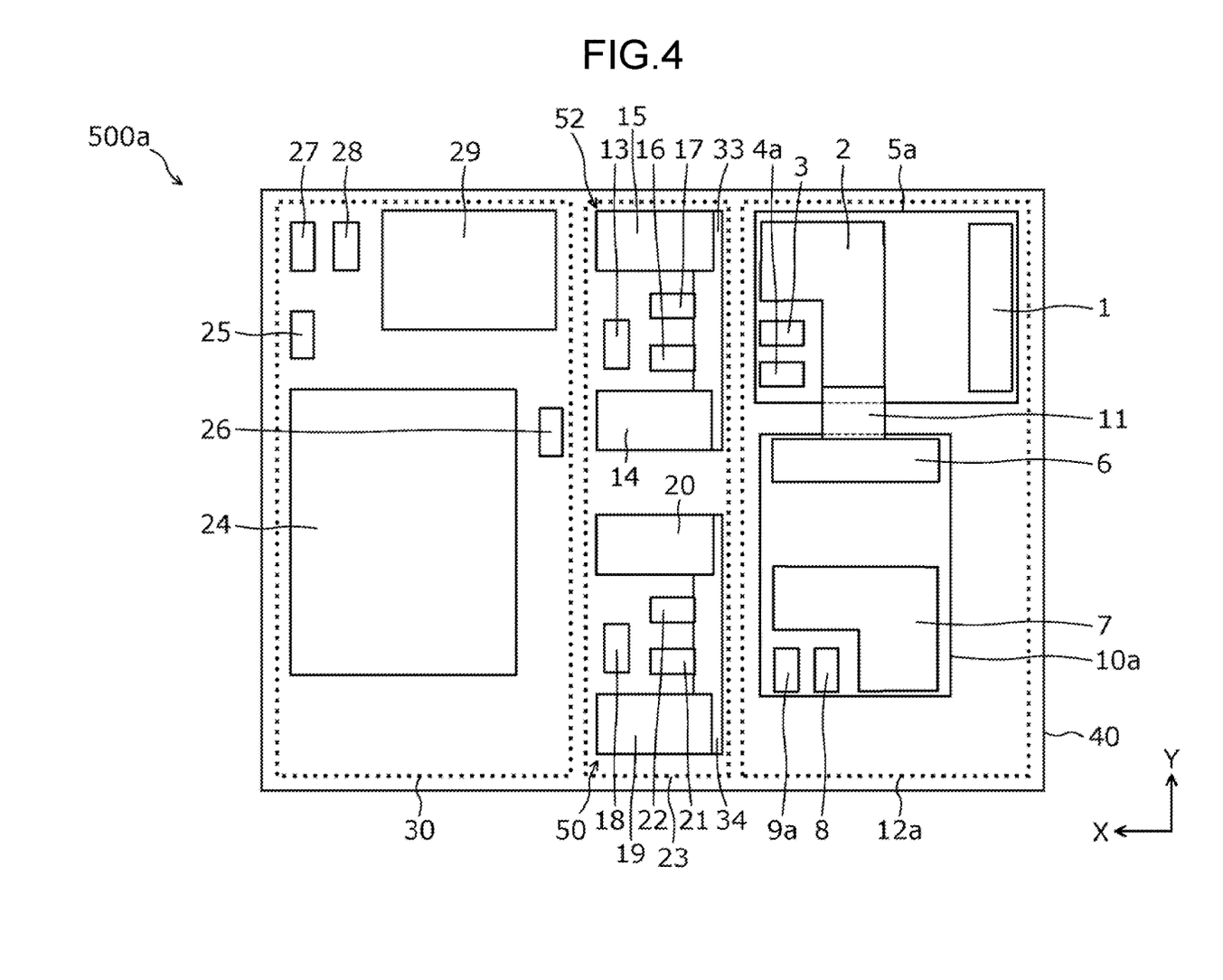
FIG. 4 is a diagram of a component arrangement around a transistor in a first modification example of the first exemplary embodiment of the present disclosure.

A first modification example of the first exemplary embodiment of the present disclosure will be described. FIG. 4 is a diagram illustrating a component arrangement diagram in the first modification example of the first exemplary embodiment of the present disclosure. As illustrated in FIG. 4, in power supply device 500a according to the first modification example, transistor block 12a includes low-side transistor 10a and high-side transistor 5a. Low-side transistor 10a includes first source sense terminal 8 between first gate terminal 9a and first source terminal 7, and high-side transistor 5a includes second source sense terminal 3 between second gate terminal 4a and second source terminal 2.

In low-side transistor 10a, first source terminal 7, first source sense terminal 8, and first gate terminal 9a are arranged in this order in the first direction. Specifically, first source terminal 7, first source sense terminal 8, and first gate terminal 9a are arranged in this order in one direction (X-axis plus direction) in the first direction. In high-side transistor 5a, second source terminal 2, second source sense terminal 3, and second gate terminal 4a are arranged in this order in the second direction.

By connecting first source sense terminal 8 and second source sense terminal 3 to first gate drive circuit 50 and second gate drive circuit 52, respectively, it is possible to more stably perform an operation in switching at a high frequency. Further, in a case where the transistors are arranged as illustrated in FIG. 4, second source sense terminal 3 of high-side transistor 5a is disposed on the same side as gate drive circuit block 23 as viewed from a straight line (not illustrated) that passes through a center of transistor block 12a and is parallel to the second direction. Specifically, second source sense terminal 3 is disposed on a side of transistor block 12a facing gate drive circuit block 23. Therefore, a wiring (not illustrated) electrically connecting second source sense terminal 3 and gate drive circuit block 23 does not pass through a region between high-side transistor 5a and low-side transistor 10a. Therefore, the wiring electrically connecting second source sense terminal 3 and gate drive circuit block 23 does not affect a length of board wiring 11. As a result, there is an effect of reducing EMI noise.

As described above, in power supply device 500a according to the first modification example of the first exemplary embodiment, low-side transistor 10a further includes first source sense terminal 8. High-side transistor 5a further includes second source sense terminal 3. In low-side transistor 10a, first source terminal 7, first source sense terminal 8, and first gate terminal 9a are arranged in this order. In high-side transistor 5a, second source terminal 2, second source sense terminal 3, and second gate terminal 4a are arranged in this order.

According to this, by connecting first source sense terminal 8 to first gate drive circuit 50 and connecting second source sense terminal 3 to second gate drive circuit 52, it is possible to more stably perform an operation in switching at a high frequency.

Second Modification Exampleo First Exemplary Embodiment

Figure 5:
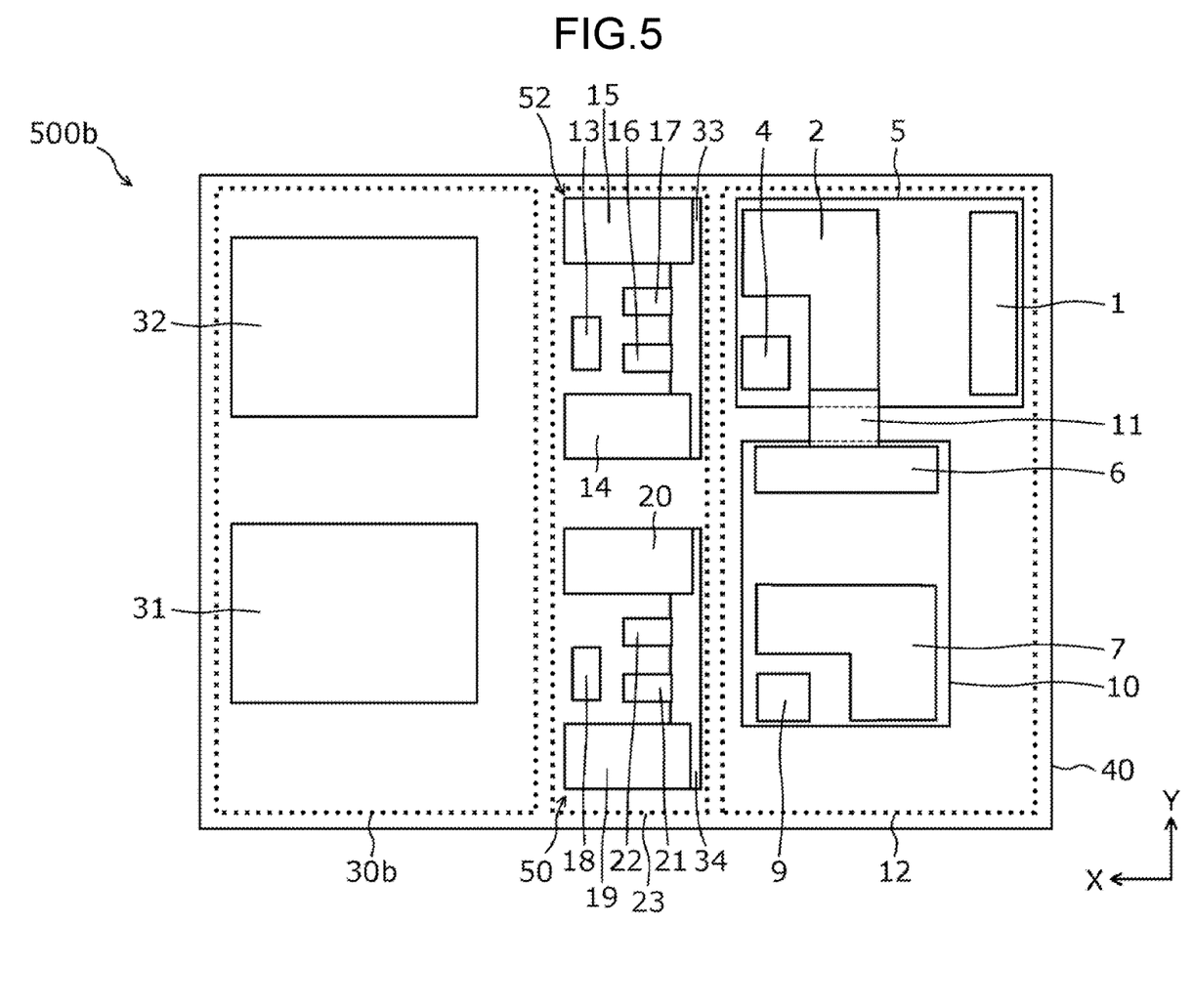
FIG. 5 is a diagram of a component arrangement around a transistor in a second modification example of the first exemplary embodiment of the present disclosure.

A second modification example of the first exemplary embodiment of the present disclosure will be described. FIG. 5 is a diagram illustrating a component arrangement diagram in the second modification example of the first exemplary embodiment of the present disclosure. As illustrated in FIG. 5, in power supply device 500b according to the second modification example, driver block 30b includes low-side gate driver 31 and high-side gate driver 32. Low-side gate driver 31 is electrically connected to first gate drive circuit 50 on a low side. High-side gate driver 32 is electrically connected to second gate drive circuit 52 on a high side. By separating the low-side gate driver and the high-side gate driver, a wiring length of a wiring (not illustrated) connecting low-side gate driver 31 and first gate drive circuit 50 can be shortened, a wiring length of a wiring (not illustrated) connecting high-side gate driver 32 and second gate drive circuit 52 can be shortened, and more stable driving can be performed.

Third Modification Example of First Exemplary Embodiment

Figure 6:
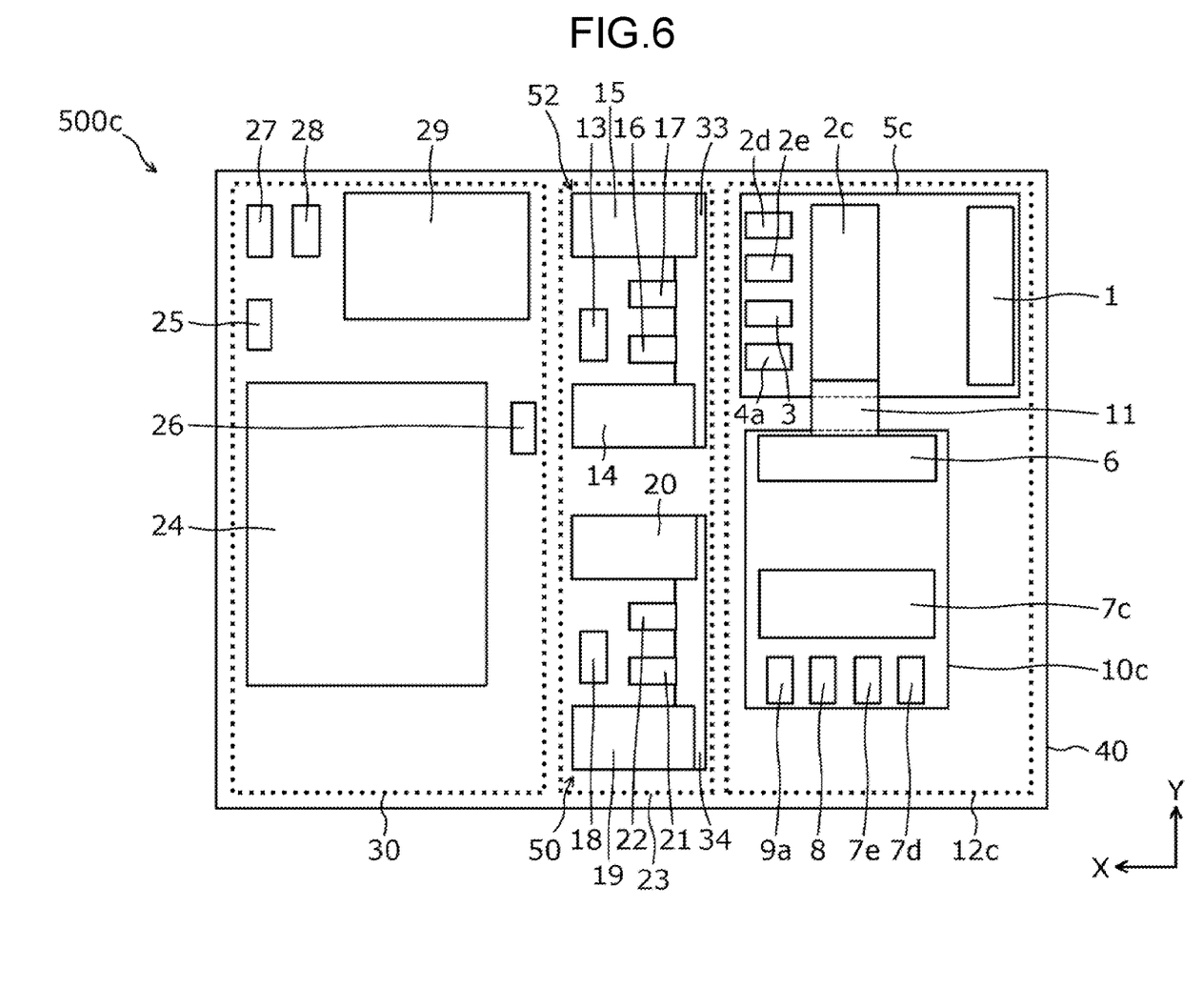
FIG. 6 is a diagram of a component arrangement around a transistor in a third modification example of the first exemplary embodiment of the present disclosure.

A third modification example of the first exemplary embodiment of the present disclosure will be described. FIG. 6 is a diagram illustrating a component arrangement diagram in the third modification example of the first exemplary embodiment of the present disclosure. As illustrated in FIG. 6, in power supply device 500c according to the third modification example, transistor block 12c includes low-side transistor 10c and high-side transistor 5c. A first source terminal of low-side transistor 10c and a second source terminal of high-side transistor 5c are separated into a plurality of terminals. Specifically, low-side transistor 10c includes first source terminals 7c, 7d, 7e separated from each other. High-side transistor 5c includes second source terminals 2c, 2d, 2e separated from each other. By separating the first source terminal and the second source terminal into a plurality of terminals, when a new element is mounted (at the time of secondary mounting), non-uniformity of an amount of solder between the source terminals and a mount board can be reduced, and inclination of the element with respect to the mount board in the secondary mounting can be suppressed.

Second Exemplary Embodiment

Figure 7:
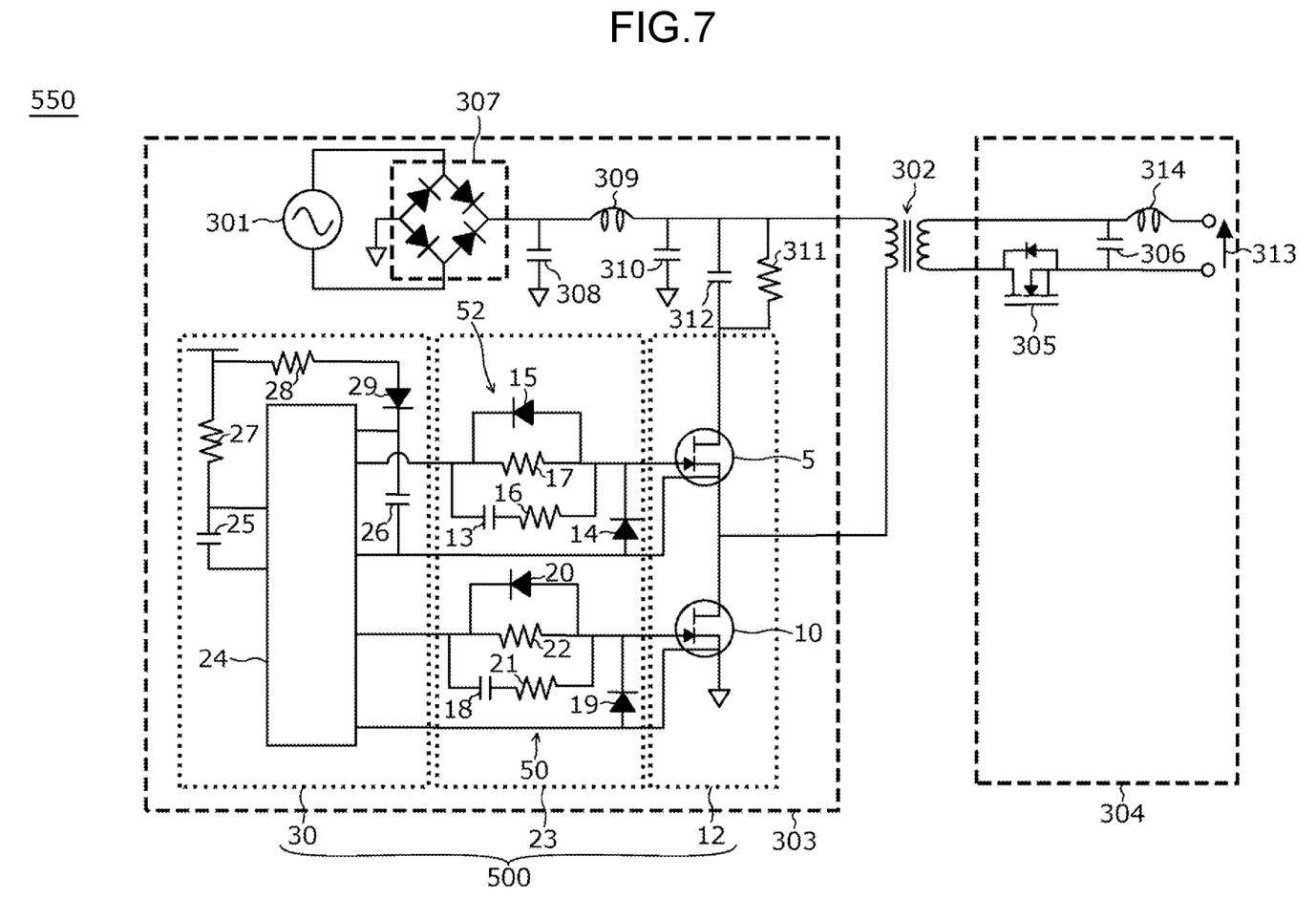
FIG. 7 is a circuit diagram of an ACF converter according to a second exemplary embodiment of the present disclosure.

A second exemplary embodiment of the present disclosure will be described. FIG. 7 is a diagram illustrating an example of a circuit diagram of an active clamp flyback (ACF) converter 550 in the second exemplary embodiment.

As illustrated in FIG. 7, ACF converter 550 includes transformer 302 including a primary side and a secondary side, primary circuit 303 connected to the primary side of transformer 302 and including an input alternating-current power supply (hereinafter, referred to as "input 301"), and secondary circuit 304 connected to the secondary side of the transformer 302. For example, 100 V of AC power is input from input 301. Primary circuit 303 includes power supply device 500 including transistor block 12, gate drive circuit block 23, and driver block 30. Primary circuit 303 includes low-side transistor 10 connected to the ground, and high-side transistor 5 connected to low-side transistor 10. Secondary circuit 304 includes rectifier element 305, capacitance 306 connected to rectifier element 305, and output 313. Output 313 is two terminals that output DC power obtained by converting the AC power of input 301. High-side transistor 5 and low-side transistor 10 are made of, for example, GaN transistors. Rectifier element 305 is made of, for example, silicon (Si)-metal oxide semiconductor field effect transistor (MOSFET). Rectifier element 307 including a Si-diode is connected to input 301 of primary circuit 303. An LC filter and an RC circuit are connected between rectifier element 307 and transistor 5. The LC filter includes capacitance 308 having a capacitance of 1 µF, for example, and coil 309 having an inductance of 22 pH, for example. The RC circuit includes input capacitance 310 having a capacitance of, for example, 82 g, resistor 311 having a resistance value of, for example, 2 MΩ, and capacitance 312 having a capacitance value of, for example, 0.22 g. Coil 314 having an inductance of 1 µH, for example, is connected between capacitance 306 and output 313 of secondary circuit 304. ACF converter 550 is an example of an AC-DC converter having the above-described circuit configuration.

As described above, ACF converter 550 in the second exemplary embodiment includes transformer 302 including the primary side and the secondary side, primary circuit 303 connected to the primary side of transformer 302 and including input 301, and secondary circuit 304 connected to the secondary side of transformer 302. Primary circuit 303 includes power supply device 500 including transistor block 12, gate drive circuit block 23, and driver block 30. Secondary circuit 304 includes rectifier element 305, and capacitance 306 connected to rectifier element 305.

According to this, EMI noise can be reduced, and a smaller ACF converter can be obtained.

Third Exemplary Embodiment

Figure 8:
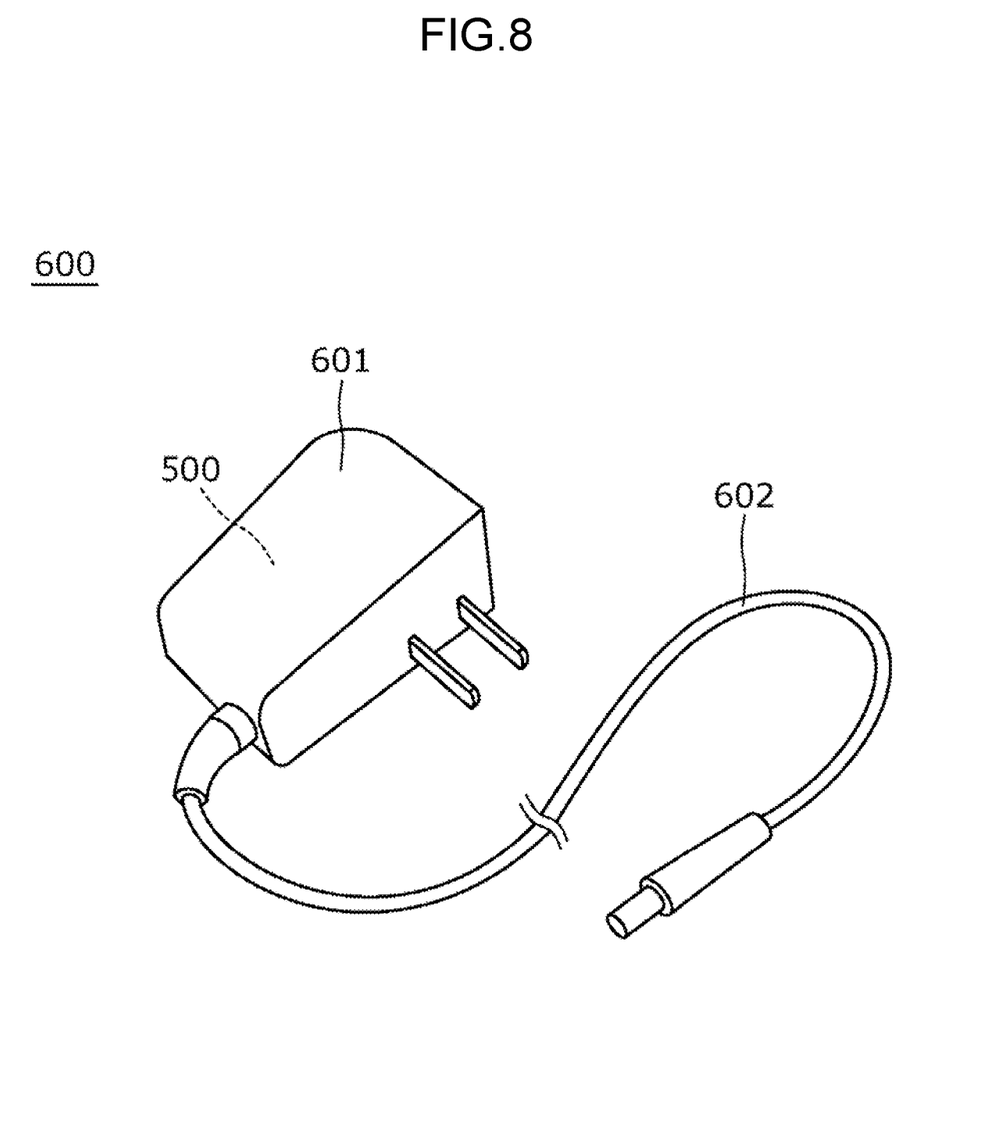
FIG. 8 is a perspective view illustrating an AC adapter according to a third exemplary embodiment of the present disclosure.

A third exemplary embodiment of the present disclosure will be described. FIG. 8 is a perspective view illustrating AC adapter 600 according to the third exemplary embodiment of the present disclosure. As illustrated in FIG. 8, AC adapter 600 is a device that converts AC power from a commercial power supply into DC power. AC adapter 600 includes main body 601 and cable 602. By inserting main body 601 into an outlet and connecting cable 602 to a smartphone or the like, the smartphone or the like can be charged. AC adapter 600 includes power supply device 500 or ACF converter 550 including power supply device 500 in main body 601. As described above, AC adapter 600 uses power supply device 500 or ACF converter 550 including power supply device 500. Note that FIG. 8 illustrates a case where AC adapter 600 includes power supply device 500 in main body 601.

As described above, power supply device 500 or ACF converter 550 including power supply device 500 is used as AC adapter 600 in the third exemplary embodiment.

According to this, EMI noise can be reduced, a component mounting area can be suppressed, and downsizing of the AC adapter can be achieved.

INDUSTRIAL APPLICABILITY

The power supply device according to the present disclosure can also be used as an ACF converter that is a typical configuration of a switching power supply, an AC-DC converter including a full bridge configured using half bridges or two half bridges, or a three-phase inverter configured using three half bridges. Further, the power supply device of the present invention can be used particularly for an AC adapter with strict EMI regulations.

The invention claimed is:

1. A power supply device comprising:
    a transistor block including a first transistor and a second transistor, the first transistor including a first drain terminal, a first source terminal, and a first gate terminal, the first source terminal being connected to a ground, the second transistor including a second drain terminal, a second source terminal, and a second gate terminal, the second source terminal being connected to the first drain terminal;
    a gate drive circuit block including a first gate drive circuit and a second gate drive circuit, a first gate drive circuit outputting a drive signal for driving the first transistor and including a passive element, the second gate drive circuit outputting a drive signal for driving the second transistor and including a passive element; and
    a driver block that outputs a pulse signal to the gate drive circuit block, wherein
    the transistor block, the gate drive circuit block, and the driver block are arranged in this order in one direction,
    the first gate terminal and the second gate terminal are disposed on a side same as the gate drive circuit block when viewed from a center of the transistor block,
    an output terminal of the first gate drive circuit and an output terminal of the second gate drive circuit are disposed on a side same as the transistor block when viewed from a center of the gate drive circuit block,
    at least a part of the first drain terminal is included in a region sandwiched between the first source terminal and the second source terminal, and
    the second drain terminal is disposed at a position deviated from an extension region that extends the region sandwiched between the first source terminal and the second source terminal beyond the second source terminal when viewed from the first source terminal.

2. The power supply device according to claim 1, wherein the first transistor and the second transistor are assembled in a surface mount package.

3. The power supply device according to claim 1, wherein the first transistor and the second transistor include gallium nitride (GaN) transistors.

4. The power supply device according to claim 1, wherein
    the first transistor further includes a first source sense terminal, and the second transistor further includes a second source sense terminal,
    in the first transistor, the first source terminal, the first source sense terminal, and the first gate terminal are arranged in this order, and
    in the second transistor, the second source terminal, the second source sense terminal, and the second gate terminal are arranged in this order.

5. The power supply device according to claim 1, wherein a positional relationship between the second gate terminal and the second source terminal as viewed from the second drain terminal is opposite to a positional relationship between the first gate terminal and the first source terminal as viewed from the first drain terminal.

6. The power supply device according to claim 1, wherein a length of a wiring electrically connecting the second source terminal and the first drain terminal is shorter than a length of a long side of the first transistor and shorter than a length of a long side of the second transistor.

7. The power supply device according to claim 1, wherein the first gate drive circuit and the second gate drive circuit include one or more of a resistor, a capacitance, and a diode.

8. An active clamp flyback (ACF) converter comprising:
    a transformer including a primary side and a secondary side;
    a primary circuit connected to the primary side of the transformer and including an input; and
    a secondary circuit connected to the secondary side of the transformer, wherein
    the primary circuit includes the power supply device according to claim 1, and
    the secondary circuit includes a rectifier element and a capacitance connected to the rectifier element.

9. An AC adapter using the power supply device according to claim 1.

10. An AC adapter using the active clamp flyback (ACF) converter according to claim 8.

* * * * *